United States Patent Office 3,689,301
Patented Sept. 5, 1972

3,689,301
TRANSFER ELEMENTS AND PROCESS FOR PREPARING SAME
Michael A. Scott, South Croydon, England, assignor to Columbia Ribbon and Carbon Manufacturing Co., Inc., Glen Cove, N.Y.
No Drawing. Continuation-in-part of application Ser. No. 775,121, Nov. 12, 1968. This application Dec. 30, 1970, Ser. No. 102,892
Claims priority, application Great Britain, Nov. 25, 1967, 53,710/67
Int. Cl. B41m 5/10
U.S. Cl. 117—36.4    10 Claims

ABSTRACT OF THE DISCLOSURE

Method of producing novel pressure-sensitive transfer elements having a polyolefin film foundation, preferably polypropylene, and a solvent-applied non-transferable resinous ink layer which exudes ink to a copy sheet under imaging pressure. The resinous ink layer is bonded to the foundation by means of a bonding layer comprising a mixture of a major amount by weight of a cured polyurethane polymer which is insoluble in the solvent of the ink layer and a minor amount by weight of a synthetic thermoplastic polymer which is soluble in said solvent.

---

This application is a continuation-in-part of parent application Ser. No. 775,121, filed Nov. 12, 1968, now abandoned.

The present invention relates to squeeze-out type transfer elements such as carbon papers and typewriter ribbons having a plastic film foundation supporting a microporous, ink-releasing layer comprising a non-transferable microporous structure or sponge of synthetic thermoplastic resin containing within the pores thereof a pressure-exudable ink comprising an oily vehicle and coloring matter such as pigment or dyestuff. The ink releasing layer is applied as a solution, dispersion or emulsion of the synthetic thermoplastic resin in a volatile solvent or vehicle and the porosity results from the separation of the dispersed ink from the resin when the solvent or vehicle is evaporated. Separation is caused by the incompatibility between the resin and the oily ink vehicle. Transfer elements of this type are illustrated by U.S. Pats. 2,820,717; 2,944,037; 3,037,879 and 3,314,814.

Initially, squeeze-out type transfer elements employed a paper foundation for supporting the transfer composition layer. Foundations of thin flexible plastic films, for example polyethylene terephthalate film, have certain advantages over paper foundations as taught in U.S. Pat. 3,037,879. However adhesion difficulties between the transfer composition layer and plastic foundation may arise, as also taught in U.S. Pat. 3,037,879. The poorer adhesion may be due to the relative lack of "tooth," as compared to paper, provided by the smooth surface of the plastic film; some plastic films also provide inherently less-receptive surfaces than others, an important example here being provided by films of polyolefins, such as polyethylene and polypropylene. Such films are conventionally surface-treated to partially oxidize the surface and improve its receptivity, but many coatings, particularly vinyl coatings, have poor adhesion even to pre-treated polyolefin films.

A preferred class of resin for the microporous sponge is that of vinyl chloride-vinyl acetate copolymers, and it is accordingly one main object of the present invention to provide an improved form of pressure-sensitive transfer element comprising a polyolefin film foundation and a squeeze-out type transfer composition employing a microporous vinyl chloride-vinyl acetate copolymer sponge.

The present invention achieves this object by providing between the polyolefin film foundation and the solvent-applied ink layer, an undercoating or bonding layer comprising a mixture of a major amount by weight of a cured polyurethane polymer (which has been cured to the stage where it is no longer soluble in organic solvents) and a minor amount by weight of a synthetic thermoplastic polymer which is at least partially soluble in the solvent used to apply the ink layer.

By the phrase "synthetic thermoplastic polymer" is meant a polymer selected from the class consisting of vinyl resins, which term includes acrylic resins and polymers and copolymers of styrene and other vinyl monomers of aromatic nature, cellulose esters, polyesters and polyamides. Preferred resins, in addition to the vinyl chloride-vinyl acetate copolymers previously mentioned, include methyl methacrylate and cellulose acetate-butyrate. Other useful resins include methyl methacrylate-ethyl acrylate, styrene-methyl methacrylate copolymers, polyvinyl chloride, polyvinyl fluoride, cellulose acetate, cellulose propionate.

The present invention accordingly provides a pressure-sensitive transfer element comprising a polyolefin film foundation having a partially oxidised surface, a layer of a transfer composition comprising a microporous thermoplastic resin sponge containing within the pores thereof a pressure-exudable ink comprising an oily vehicle and coloring matter, and a bonding layer or undercoating comprising a mixture of a cured polyurethane polymer and a second synthetic thermoplastic polymer bonding the transfer composition layer to the film foundation.

Preferred polyolefins for use as the film foundation are polyethylene and, in particular, polypropylene. Such polyolefins are preferably oriented to provide increased strength and tear resistance, and are advantageous because of their relatively low cost and high deformability as compared to films such as polyethylene terephthalate polyester. Such polyolefins are also surface-treated in conventional manner to improve their receptivity. The conventional surface treatment produces a partial oxidation of the surface of the polyolefin film. This is preferably accomplished by corona discharge or electrostatic treatment. However other means are conventionally used including flame treatment and treatment with oxidizing agents, such as ozone.

The polyurethane resins useful according to this invention are a well-known class of synthetic polymeric materials and are derived from condensation of an excess amount of a polyfunctional, normally bifunctional, isocyanate with compounds and/or low polymers containing reactive hydrogen atoms, for example alcohols and polyalcohols (reactive hydrogen atom provided by the —OH group), primary or secondary amines and polyamines (reactive hydrogen atom provided by the —NH$_2$ and —NH groups respectively) and polycarboxylic acids or alkyd resins containing free acid groups (reactive hydrogen provided by —COOH groups). The isocyanate group reacts with the reactive hydrogen atom to give a urethane linkage, and a cured polyurethane results from the presence of a cross-linking agent such as water, a glycol or other difunctional curing agent. The suitable polyurethanes may be classified as the polyether polyurethanes, the polyamine polyurethanes and the polyester polyurethanes, and U.S. Pat. 2,729,618 is cited as illustrative of the manufacture of suitable polyurethanes. Polyester-derived polyurethanes are preferred and suitable compositions of this type are commercially available under the registered trademarks Daltosec 1350 and 1450.

Non-curable polyurethane resins are unsatisfactory and are not used in the present invention since they cannot be cured to provide a good bond to the polyolefin film foundation.

Whilst cured polyurethane polymers alone can give a satisfactory bond between the polyolefin film and the solvent-applied ink layer under certain conditions of use, the bond is not consistent and depends upon the curing time of the polyurethane before the ink layer is applied.

(In this connection, it should be made clear that there is, at present, no instrumented procedure for measuring the bond strength between microporous polymer ink layers of the kind referred to in this specification and the film foundations to which they are applied; conventional peel strength tests as applied to plastic laminates cannot be used because of the low mechanical strength of such microporous polymer ink layers. The assessment of bond strength is typically based on manual mal-treatment or typewriter use of the transfer material followed by visual inspection and is, therefore, largely subjective.)

The bond between the solvent-applied ink layer and the polyolefin film, that is the overall bond of the transfer element, depends on the bond between the polyolefin film and the polyurethane undercoating (which will be referred to, for convenience, as the "first bond") and on the bond between the polyurethane undercoating and the ink layer (which will be referred to, for convenience, as the "second bond"); both the first and second bonds must be of adequate strength if the overall bond is to be satisfactory. When an undercoating of polyurethane alone is used and this is coated with a solvent-applied ink layer, the strength of the first and second bonds varies with the time that elapses between the application of the undercoating and the application of the ink layer, that is the time for which the polyurethane is allowed to cure before the application of the ink layer. As far as the first bond is concerned, there is a rapid increase in bond strength as the initial curing of the polyurethane takes place and then a more gradual increase over a period of days, or even weeks. At the end of the initial curing period the polyurethane is substantially cured and is no longer soluble in organic solvents, but will be solvent-sensitive so that it can be swollen by organic solvents. The length of the initial curing period varies widely depending upon the curing conditions; if a stream of hot moist air (say at a temperature of 120–150° F.) is impinged on the polyurethane coating immediately it has been applied, initial curing takes only some seconds and after, say, a minute there is then only a gradual increase in the strength of the first bond. On the other hand, under normal ambient conditions, the initial curing period may be as long as 1 or 2 days.

On the other hand, the second bond has a high value when there is a short curing period before the ink layer is applied, and the strength of this bond gradually decreases as the curing time is increased until there comes a point, say, when the polyurethane is allowed to cure for 14 days before application of the ink layer, when the second bond is definitely inadequate.

The present invention is based on the unexpected discovery that a consistent and consistently better overall bond between the solvent-applied ink layer and the polyolefin film can be obtained by incorporating a minor amount of a thermoplastic polymer in the polyurethane undercoating. The presence of the thermoplastic polymer gives a considerable increase in the strength of the second bond for all curing periods after the initial curing of the polyurethane and prevents the strength of this bond dropping to unacceptable levels however long the polyurethane has been cured before application of the ink layer. More surprisingly, whilst the presence of the thermoplastic polymer might have been expected to reduce the strength of the first bond to an unacceptable level, by interfering in the bonding between the polyurethane and the pre-treated polyolefin surface, I have found that this does not happen.

Since, in commercial production it is often convenient or necessary to carry out the undercoating operation and the application of the solvent-applied ink layer as separate passes through the appropriate coating apparatus, with a variable period of storage of the undercoated material before the second pass, it will be appreciated that the variability and inconsistency of the overall bond obtained when polyurethane alone is used as the undercoating is quite unacceptable. By using a polyurethane undercoating which also contains a thermoplastic polymer, this problem does not arise.

The undercoating suitably comprises 1 part by weight of polyurethane and from about 0.05 up to 0.9 part by weight of the synthetic thermoplastic polymer, the preferred range being 1 part of polyurethane and from 0.1 to 0.5 part of thermoplastic polymer.

Preferred synthetic thermoplastic polymers for use in the undercoating are the vinyl resins, such as polyvinyl acetate, vinyl chloride-vinyl acetate copolymers, vinylidene chloride-acrylonitrile copolymers, and the like. Also suitable are the cellulose esters such as nitrocellulose and cellulose acetate-butyrate, and other synthetic thermoplastic polymers which are at least partially soluble in the volatile solvent used to apply the ink layer, and, of course, soluble in the solvent used to apply the undercoating composition.

The manufacture of the present transfer elements can be carried out by conventional techniques. Thus a layer of undercoating composition can be applied to the plastic film by means of a gravure roll and the transfer composition layer subsequently applied after the undercoating layer has dried and cured. The undercoating composition contains the reactive component or components forming the eventual polyurethane together with the synthetic thermoplastic polymer and one or more volatile solvents.

The present invention is illustrated by the following examples.

EXAMPLE I

Polypropylene film of thickness 8 points (1 point=.0001 inch) is used which has its surfaces partially oxidized by means of corona discharge pretreatment. To one treated surface of the film there was applied by means of a gravure cell roll a polyurethane composition of the following constitution by weight, in sufficient quantity to provide after evaporation of the solvent a layer of thickness about ¼ point and about 1.5 gms./sq. m. dry weight.

| | |
|---|---|
| Moisture-curable, saturated polyester-based, urethane prepolymer | 20.0 |
| Ethyl acetate | 10.0 |
| Vinylite AYAT | 4.0 |
| Methyl ethyl ketone | 36.0 |
| | 70.0 |

After evaporation of the solvents, curing was substantially complete. A transfer composition of the following constitution by weight was then applied by an equalizer (conventional wire wound rod), to provide an transfer layer after evaporation of the solvent of thickness about 8 points, and 24 gms./sq.m. dry weight.

| | |
|---|---|
| Ground pigment paste (containing oil, black toner and lecithin or other wetting agent) | 25.0 |
| Vinylite VYHH | 10.0 |
| Methyl ethyl ketone | 40.0 |
| Toluene | 20.0 |
| | 95.0 |

Vinylite AYAT is a proprietary brand of polyvinyl acetate. Vinylite VYHH is a proprietary brand of vinyl chloride-vinyl acetate copolymer. The urethane prepolymer employed was in the form of a 1:1 mixture of Daltosec 1350 and 1450; both the latter are proprietary products obtainable from Messrs. Imperial Chemical Industries Ltd. Dyestuffs Division, and are already 50% solutions by weight, in ethyl acetate as solvent, of urethane prepolymers. The ground pigment paste comprises the oily ink vehicle, such as mineral oil, refined rapeseed oil, butyl stearate and/or sulfonated vegetable oil, and a toned carbon black pigment in a ratio of about 2:1.

The final transfer element exhibited excellent adhesion of the transfer layer to the polyolefin film foundation.

EXAMPLE II

The procedure of Example I is repeated using the following compositions to form the undercoating and ink layer, respectively, in place of the compositions of Example I.

Undercoating

| | |
|---|---|
| Moisture-curable, saturated polyester-based, urethane prepolymer | 34.0 |
| Nitrocellulose | 6.5 |
| Methyl ethyl ketone | 59.5 |
| | 100.0 |

Ink layer

| | |
|---|---|
| Vinylite VYHH | 11.4 |
| Oleyl alcohol | 14.0 |
| Blue dye | .6 |
| Carbon black | 8.0 |
| Toluene | 24.0 |
| Methyl ethyl ketone | 42.0 |
| | 100.0 |

Variations and modifications may be made within the scope of the claims and portions of the improvements may be used without others.

I claim:

1. The process of producing a pressure-sensitive transfer element which comprises the steps of:
    (a) applying over a flexible polyolefin film foundation having a partially oxidized surface, a thin layer comprising a solution of 1 part by weight of a curable polyurethane and from about 0.05 to 0.9 part by weight of a synthetic thermoplastic polymer in a volatile solvent;
    (b) evaporating said solvent and curing said polyurethane to form a thin bonding layer on said polyolefin film;
    (c) applying over said bonding layer a thin layer comprising a synthetic thermoplastic polymer, an oily material which is substantially incompatible with said polymer, an amount of coloring matter and a volatile solvent for said polymer, said volatile solvent being one in which the cured polyurethane is insoluble and in which the synthetic thermoplastic polymer of said bonding layer is at least partially soluble; and
    (d) evaporating said volatile solvent to form a microporous, ink-releasing layer strongly bonded to said film foundation by means of said bonding layer, said ink-releasing layer comprising a non-transferable microporous structure of said synthetic thermoplastic polymer containing within the pores thereof a pressure-exudable ink comprising said oily material and coloring matter.

2. The process according to claim 1 in which the film foundation comprises polypropylene.

3. The process according to claim 1 in which the bonding layer comprises a mixture of 1 part by weight of said polyurethane and from about 0.1 to 0.5 part by weight of said synthetic thermoplastic polymer.

4. The process according to claim 3 in which said synthetic thermoplastic polymer is a vinyl acetate polymer.

5. The process according to claim 1 in which the film foundation comprises polypropylene, the bonding layer comprises a mixture of 1 part by weight of said polyurethane polymer and from about 0.05 to 0.9 part by weight of a thermoplastic polymer selected from the group consisting of vinyl resins and cellulose esters, and the synthetic thermoplastic resin of the ink-releasing layer comprises a copolymer of vinyl chloride and vinyl acetate.

6. A pressure-sensitive transfer element comprising a flexible polyolefin film foundation having a partially oxidized surface, a layer of a transfer composition comprising a microporous synthetic thermoplastic resin sponge containing within the pores thereof a pressure-exudable ink comprising an oily vehicle and coloring matter, a thin bonding layer comprising a mixture of 1 part by weight of cured polyurethane polymer and from about 0.05 to 0.9 part by weight of a synthetic thermoplastic polymer bonding the transfer composition layer to the partially oxidized surface of the film foundation.

7. A pressure-sensitive transfer element according to claim 6 in which the film foundation comprises polypropylene.

8. A pressure-sensitive transfer element according to claim 6 in which the bonding layer comprises a mixture of 1 part by weight of said polyurethane polymer and from 0.1 to 0.5 part by weight of said synthetic thermoplastic polymer.

9. A pressure-sensitive transfer element according to claim 8 wherein the synthetic thermoplastic polymer comprises a vinyl acetate polymer.

10. A pressure-sensitive transfer element according to claim 6 in which the film foundation comprises polypropylene, the ink layer comprises a microporous vinyl chloride-vinyl acetate copolymer sponge, and the bonding layer comprises a mixture of 1 part by weight of said cured polyurethane polymer and from 0.1 to 0.5 part by weight of a thermoplastic polymer selected from the group consisting of vinyl resins and cellulose esters.

References Cited

UNITED STATES PATENTS

| 3,037,879 | 6/1962 | Newman et al. | 117—36.4 |
| 3,502,475 | 3/1970 | Kane | 117—76 F |
| 3,198,692 | 8/1965 | Bridgeford | 117—76 F |

MURRAY KATZ, Primary Examiner

U.S. Cl. X.R.

117—76 F, 138.8 E